United States Patent
Ochiai et al.

(10) Patent No.: US 10,355,627 B2
(45) Date of Patent: Jul. 16, 2019

(54) MOTOR DRIVE CIRCUIT, BRUSHLESS MOTOR DRIVE DEVICE PROVIDED WITH MOTOR DRIVE CIRCUIT, AND MOTOR CONTROL METHOD

(71) Applicant: Panasonic Intellectual Property Management Co., Ltd., Osaka (JP)

(72) Inventors: Akihiro Ochiai, Osaka (JP); Yasushi Kato, Kyoto (JP); Masahiro Yasohara, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/079,903

(22) PCT Filed: Feb. 21, 2017

(86) PCT No.: PCT/JP2017/006272
§ 371 (c)(1),
(2) Date: Aug. 24, 2018

(87) PCT Pub. No.: WO2017/159230
PCT Pub. Date: Sep. 21, 2017

(65) Prior Publication Data
US 2019/0068091 A1    Feb. 28, 2019

(30) Foreign Application Priority Data
Mar. 14, 2016   (JP) ................. 2016-049293

(51) Int. Cl.
*H02P 6/16* (2016.01)
*H02K 29/08* (2006.01)
*H02P 6/182* (2016.01)

(52) U.S. Cl.
CPC ............... *H02P 6/16* (2013.01); *H02K 29/08* (2013.01); *H02P 6/182* (2013.01)

(58) Field of Classification Search
CPC .......... H02P 6/182; H02P 6/22; H02K 29/08; H02K 11/33; H02K 29/06; G05B 19/4062; G05B 2219/42287
See application file for complete search history.

(56) References Cited

U.S. PATENT DOCUMENTS

2002/0024308 A1   2/2002   Kato et al.
2009/0108716 A1*  4/2009   Teshima ............. H02K 29/08
                                                  310/68 B
(Continued)

FOREIGN PATENT DOCUMENTS

JP      5-111285      4/1993

OTHER PUBLICATIONS

International Search Report of PCT application No. PCT/JP2017/006272 dated Apr. 25, 2017.
(Continued)

*Primary Examiner* — Shawki S Ismail
*Assistant Examiner* — Zoheb S Imtiaz
(74) *Attorney, Agent, or Firm* — McDermott Will & Emery LLP (57) ABSTRACT

A motor drive circuit includes; a rotor position detector that detects a position of a rotor and outputs a rotor position detection signal; a rotor position signal generator that generates signals P1, P2, P3, P4, P5, and P6 as a rotor position signal based on the rotor position detection signal output from the rotor position detector; a rotation direction recognition unit that recognizes a rotation direction of the rotor each time one of signals P1, P2, P3, P4, P5, and P6 is input and replaces the rotor position signal with a corrected rotor position signal; and a winding current output unit that outputs a current to a winding based on the corrected rotor position signal.

5 Claims, 4 Drawing Sheets

(56) References Cited

U.S. PATENT DOCUMENTS

| | | | |
|---|---|---|---|
| 2009/0218969 A1* | 9/2009 | Sato | H02P 1/16 318/400.04 |
| 2013/0229078 A1* | 9/2013 | Garber | H02K 7/09 310/90.5 |
| 2014/0225546 A1* | 8/2014 | Sato | H02P 6/10 318/400.26 |
| 2015/0002001 A1* | 1/2015 | Konradi | H02K 29/08 310/68 B |
| 2015/0137718 A1 | 5/2015 | Liu et al. | |

OTHER PUBLICATIONS

The Extended European Search Report dated Feb. 18, 2019 for the related European Patent Application No. 17766237.6.

* cited by examiner

MOTOR DRIVE CIRCUIT, BRUSHLESS MOTOR DRIVE DEVICE PROVIDED WITH MOTOR DRIVE CIRCUIT, AND MOTOR CONTROL METHOD

TECHNICAL FIELD

The present invention relates to a motor drive circuit of a brushless motor used for household electric appliances and the like, a brushless motor drive device provided with the motor drive circuit, and a motor control method.

BACKGROUND ART

A motor is an apparatus that rotates when a current is supplied thereto. When the current is supplied to the motor, an electrical interfering signal is generated, which possibly gives an adverse effect to an operation of a drive circuit housed in the motor. Advanced downsizing of motors makes it difficult to ensure a distance between an interfering signal generation source and a drive circuit as well as a ground (GND) area on a circuit board. This remarkably increases an adverse effect on the interfering signal.

Particularly, the interfering signal that is superimposed on a Hall signal used for detecting the position of a rotor causes misrecognition of the rotor position, a rotational speed, or a rotation direction. This may hinder appropriate energization. Accordingly, when being inappropriately energized, a conventional motor possibly causes an unstable operation such as overcurrent, vibration, or noise.

To solve this problem, when the conventional motor is driven, an analog filter including, for example, capacitors and resistors is employed to remove such an interfering signal. Furthermore, when the conventional motor is driven, instead of performing recognition of an actual rotation direction, a case where an order of signals, which is determined based on a directed rotation direction, is disturbed is treated as an error (for example, refer to PTL 1).

CITATION LIST

Patent Literature

PTL 1; Unexamined Japanese Patent Publication No. 5-111285

SUMMARY OF THE INVENTION

According to a configuration of PTL 1, since a motor is stopped based on determination of an error, a continuous operation of the motor is not taken into consideration.

According to the present invention, even if a rotor position detection signal contains, for example, an interfering signal, a motor is continuously driven without error-stoppage. In addition, the present invention needs no analog filter. When the present invention is employed, a motor drive circuit and a motor control method capable of stably driving a motor can be provided.

A motor drive circuit according to the present invention includes; a rotor position detector that detects a position of a rotor and outputs a rotor position detection signal, a rotor position signal generator that generates signals P1, P2, P3, P4, P5, and P6 as a rotor position signal based on the rotor position detection signal output from the rotor position detector; a rotation direction recognition unit that recognizes a rotation direction of the rotor each time one of signals P1, P2, P3, P4, P5, and P6 is input and replaces the rotor position signal with a corrected rotor position signal; and a winding current output unit that outputs a current to a winding based on the corrected rotor position signal.

When a newly received rotor position signal from the rotor position signal generator is a signal that proceeds from a preceding rotor position signal by one stage along a currently recognized rotation direction, which is defined as condition 1, the rotation direction recognition unit replaces the newly received rotor position signal with the corrected rotor position signal. Alternatively, when the newly received rotor position signal from the rotor position signal generator is a signal that returns from the preceding rotor position signal by two stages along the currently recognized rotation direction, which is defined as condition 2, the rotation direction recognition unit corrects the currently recognized rotation direction so as to be reversed, and replaces the newly received rotor position signal with the corrected rotor position signal. When the newly received rotor position signal from the rotor position signal generator is a signal according to a condition other than the condition 1 and the condition 2, the rotation direction recognition unit replaces the preceding rotor position signal with the corrected rotor position signal.

With those operations, even when an interfering signal is superimposed on the rotor position signal, the interfering signal can be removed to continuously drive the motor, which enables stable driving. For example, even when a structure in which the interfering signal is easily involved in the rotor position detection signal, for example, a structure in which the rotor position detector such as a Hall element is disposed close to an interfering signal source such as the winding or a stator core is used, or a drive circuit whose GND area is small and on which the interfering signal is easily superimposed is used, the motor drive circuit according to the present invention can continue stable motor driving. Accordingly, downsizing of the motor and the drive circuit board can be achieved. This also contributes improvement of productivity by promoting use of a circuit board in which wiring is provided on a single-side surface of the circuit board.

According to the present invention, even when the interfering signal is superimposed on the rotor position detector, stable driving can be continued.

DESCRIPTION OF EMBODIMENT

Hereinafter, an exemplary embodiment according to the present invention will be described with reference to the drawings.

Figure 1:
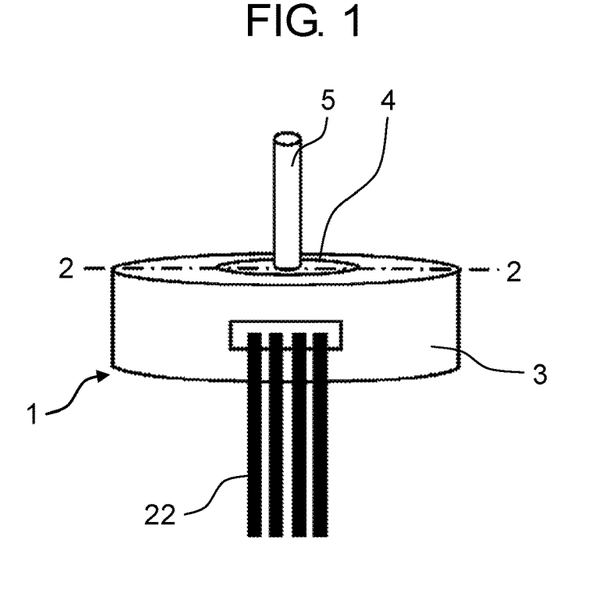
FIG. 1 is an external view of a brushless motor provided with a motor drive circuit according to an exemplary embodiment of the present invention.
Figure 2:
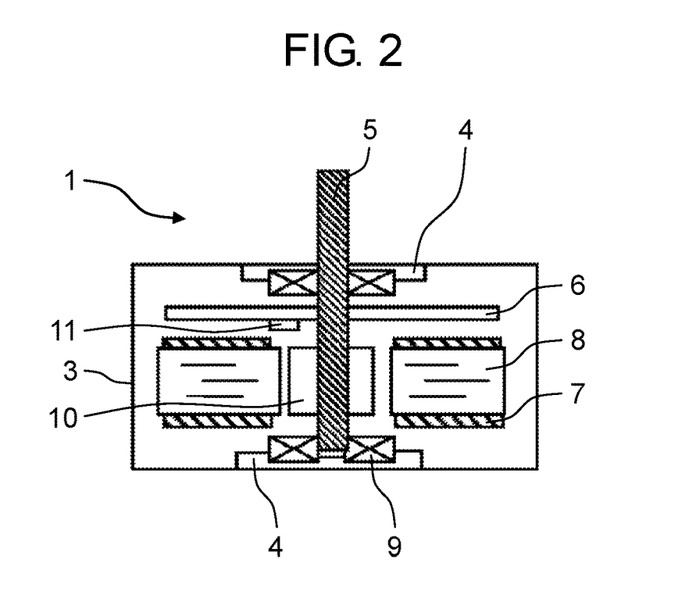
FIG. 2 is a longitudinal sectional view taken along line 2-2 in FIG. 1.

FIG. 1 is an external view of a brushless motor provided with a brushless motor drive circuit according to the exemplary embodiment of the present invention. FIG. 2 is a longitudinal sectional view taken along line 2-2 in FIG. 1.

As illustrated in FIG. 1 and FIG. 2, brushless motor 1 is a motor incorporating motor drive circuit 6. In brushless motor 1, stator assembly 3 is covered with lid-shaped frame 4, and shaft 5 protrudes out of frame 4. Lead wires 22 are attached to brushless motor 1. Lead wires 22 are used to input and output control signals and the like to be transmitted to motor drive circuit 6 and the like through a side surface of stator assembly 3.

Stator assembly 3 holds a stator in which windings 7 are respectively wound around stator cores 8 each of which is formed by laminating electromagnetic steel sheets. An end part of stator assembly 3 is covered by frame 4. Bearing 9 is held at a center part of frame 4 and another end part of stator assembly 3.

On the other hand, a rotor has a configuration in which shaft 5 and permanent magnet 10 are integrated, and is rotatably supported by bearing 9. Note that permanent magnet 10 faces an inner circumference of stator core 8 with a predetermined gap interposed therebetween.

Brushless motor 1 is provided with a board including motor drive circuit 6 for supplying a current to at least windings 7. The board is fixed to an inside of stator assembly 3. Ends of windings 7 are connected to motor drive circuit 6. Note that an example of built-in motor drive circuit 6 is described, but motor drive circuit 6 may externally be provided.

Figure 3:
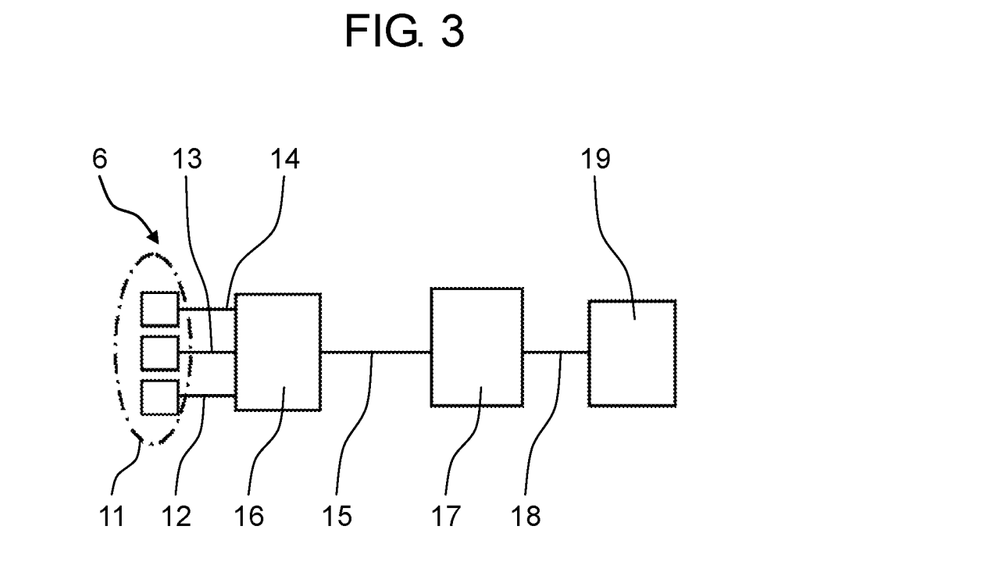
FIG. 3 is a functional block diagram of the motor drive circuit according to the exemplary embodiment of the present invention.

FIG. 3 is a functional block diagram of motor drive circuit 6 according to the exemplary embodiment of the present invention.

Three Hall sensors serving as rotor position detector 11 output sensor outputs according to a position of the rotor as rotor position detection signals 12, 13, and 14, respectively. Rotor position signal generator 16 generates rotor position signal 15 including signals P1, P2, P3, P4, P5, and P6, based on a combination of a positive value and a negative value (polarity) of each of rotor position detection signals 12, 13, and 14 from the three Hall sensors, which are output from rotor position detector 11, and sends the generated signal to rotation direction recognition unit 17.

Rotation direction recognition unit 17 recognizes a current rotation direction based on received rotor position signal 15. As will be described later, rotation direction recognition unit 17 determines whether or not received rotor position signal 15 is an interfering signal, corrects the recognition about the rotation direction as necessary, and sends corrected rotor position signal 18 to winding current output unit 19.

Note that, in the above-described example, rotor position detector 11 includes the three Hall sensors, but two or more Hall sensors only need to be used. Instead of the Hall sensors, the windings can be used as rotor position detector 11. In this case, winding induction voltages generated in the windings can be used as rotor position detection signals 12, 13, and 14.

The Hall sensors used as rotor position detector 11 possibly exert high starting performance and stability.

In contrast, a case where the windings are used as rotor position detector 11 does not need an additional sensor component to be attached, whereby space saving and downsizing can be achieved.

Figure 4:
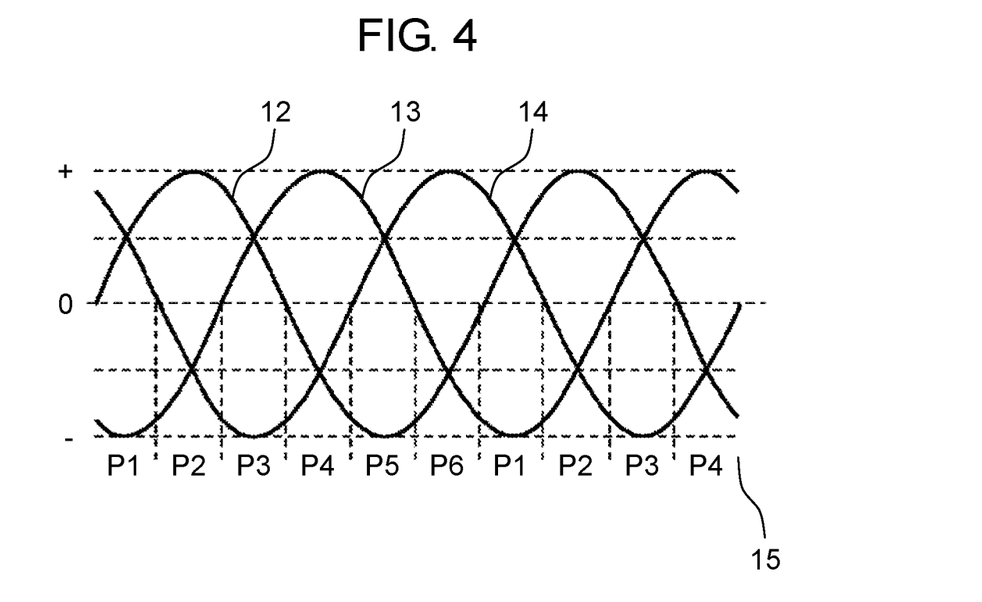
FIG. 4 is a diagram illustrating a relationship between rotor position detection signals and a rotor position signal, which are used in the motor drive circuit according to the exemplary embodiment of the present invention.

FIG. 4 is a diagram illustrating a relationship between rotor position detection signals 12, 13, and 14 and rotor position signal 15, which are used in motor drive circuit 6 according to the exemplary embodiment of the present invention. Rotor position signal generator 16 generates rotor position signal 15 including signals P1, P2, P3, P4, P5, and P6, based on polarities of three rotor position detection signals 12, 13, and 14 output from rotor position detector 11. When the motor is driven in a normal rotation direction, rotor position signals 15 is configured by repeating signals P1, P2, P3, P4, P5, P6, P1, P2, . . . , in this order. When the motor is driven in a reverse rotation direction, rotor position signals 15 is configured by repeating signals P6, P5, P4, P3, P2, P1, P6, . . . , in this order.

Figure 5:
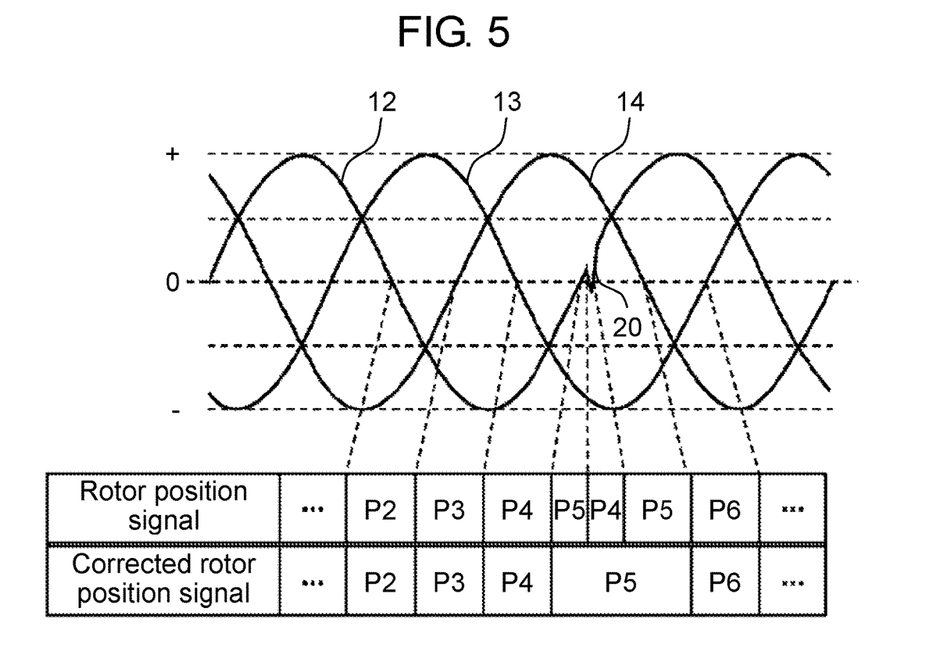
FIG. 5 is a diagram illustrating an example of interfering signal removal in the motor drive circuit according to the exemplary embodiment of the present invention.

Subsequently, an operation with an interfering signal superimposed during a normal operation will be described with reference to FIG. 5. FIG. 5 is a diagram illustrating an example of interfering signal removal in motor drive circuit 6 according to the exemplary embodiment of the present invention.

The interfering signal is possibly superimposed at any timing. However, rotor position signal 15 is generated based on the polarities of rotor position detection signals 12, 13, and 14, whereby rotor position signal 15 is most likely to be affected when interfering signal 20 is superimposed at a position where an absolute value of the rotor position detection signal is nearly zero. As a result, the polarity of the rotor position detection signal is likely to be changed.

At that time, absolute values of other rotor position detection signals have certain amounts of amplitude, whereby their polarities are less likely to be inverted. During a period where the absolute value is nearly zero, the interfering signal is more likely to be generated immediately after the polarity inversion than immediately before the polarity inversion, because the polarity of the rotor position signal has been just changed. FIG. 5 illustrates a typical example of such a case.

In FIG. 5, the rotor position signal transits from signal P2 to signal P4 through P3, and immediately after the rotor position signal reaches a position for signal P5, interfering signal 20 is superimposed on the rotor position signal. At this time, the polarity of rotor position detection signal 12 is inverted, and the rotor position signal is returned to signal P4. However, rotation direction recognition unit 17 has understood that the rotor position signal to be changed next is signal P6 based on the recognized rotation direction, and therefore determines detected signal P4 as the interfering signal. After removing the interfering signal, rotation direction recognition unit 17 keeps signal P5 that is a preceding state, and outputs the rotor position signal to winding current output unit 19 as corrected rotor position signal 18.

Generally, the interfering signal has an extremely short cycle, in comparison with a cycle of the rotor position detection signal. Even with the interfering signal, when an actual rotor position moves along a rotation direction as is recognized, the rotor position detection signal goes away from the zero proximity. As a result, rotor position signal 15 returns to signal P5 in a short time. At this time, corrected rotor position signal 18 has already recognized signal P5, and therefore rotor position signal 15 is not affected.

Subsequently, an operation in which the motor rotates in the reverse rotation direction will be described.

Table 1 indicates an operation when a motor rotating in the normal rotation direction is caused to rotate in the reverse rotation direction at certain timing.

TABLE 1

| Rotor position signal | ... | P1 | P2 | P3 | P4 | P4 | P3 | P2 | P1 | ... |
|---|---|---|---|---|---|---|---|---|---|---|
| Corrected rotor position signal | ... | P1 | P2 | P3 | P4 | P4 | P4 | P2 | P1 | ... |
| Actual rotation direction | ... | Normal | Normal | Normal | Normal | Reverse | Reverse | Reverse | Reverse | ... |
| Recognized motor rotation direction | ... | Normal | Normal | Normal | Normal | Normal | Normal | Reverse | Reverse | ... |

It is assumed that an actual rotor continues to rotate in the normal rotation direction from signal P1 to signal P4 through signal P2 and signal P3, and is then caused to rotate in the reverse rotation direction at a position for signal P4. The rotation direction is detected based on a change in rotor position signal. Therefore, at the position for signal P4, the rotor position signal does not change, and the recognized rotation direction is still the normal rotation direction. When the actual rotor continues to rotate in the reverse rotation direction, and reaches a position for signal P3, rotation direction recognition unit 17 determines, as the interfering signal, signal P3 that is returned by one stage along the reverse rotation direction and removes signal P3, because the normal rotation direction has been recognized in the preceding state of signal P4. At the same time, the preceding state of signal P4 is kept as corrected rotor position signal 18.

When the actual rotor further continues to rotate in the reverse rotation direction, and reaches a position for signal P2 that is returned by two stages along the reverse rotation direction, rotation direction recognition unit 17 determines that the rotor has been actually rotated in the reverse rotation direction, assuming that no interfering signal is included, and corrects the recognized rotation direction from the normal rotation direction to the reverse rotation direction. At the same time, rotation direction recognition unit 17 sets signal P2 to the corrected rotor position signal as a correct signal. Subsequently, when the actual rotor reaches a position for signal P1, rotation direction recognition unit 17 determines that signal P1 is a correct signal that is shifted by one stage along the reverse rotation direction that has been recognized, and sets signal P1 to the corrected rotor position signal. Hereafter, rotation direction recognition unit 17 continues to recognize the actual rotor position as it is.

Table 2 indicates an operation when a motor rotating in the reverse rotation direction is caused to rotate in the normal rotation direction at certain timing.

It is assumed that the actual rotor continues to rotate in the reverse rotation direction from signal P1 to signal P4 through P6 and signal P5, and is caused to rotate in the normal rotation direction at a position for signal P4. The rotation direction is detected based on a change in rotor position signal. Therefore, at the position for signal P4, the rotor position signal does not change, and the recognized rotation direction is still the reverse rotation direction. When the actual rotor continues to rotate in the normal rotation direction, and reaches a position for signal P5, rotation direction recognition unit 17 determines signal P5 that is returned by one stage along the normal rotation direction as the interfering signal and removes this signal, because the reverse rotation direction has been recognized in the preceding state of signal P4. At the same time, the preceding state of signal P4 is kept as corrected rotor position signal 18.

When the actual rotor further continues to rotate in the normal rotation direction, and reaches a position for signal P6 that is returned by two stages along the normal direction, rotation direction recognition unit 17 determines that the rotor has been actually rotated in the normal rotation direction, assuming that no interfering signal is included, and corrects the recognized rotation direction from the reverse rotation direction to the normal rotation direction. At the same time, rotation direction recognition unit 17 sets signal P6 to the corrected rotor position signal as a right signal. Subsequently, when the actual rotor reaches a position for signal P1, rotation direction recognition unit 17 determines that signal P1 is a right signal that is shifted by one stage along the normal rotation direction that has been recognized, and sets P1 to the corrected rotor position signal. Hereafter, rotation direction recognition unit 17 continues to recognize the actual rotor position as it is.

A rotation direction of a stopping motor cannot be detected. However, upon activating the motor, an initial value for the rotation direction may be set to any of the normal rotation direction and the reverse rotation direction.

As described above, when newly received rotor position signal 15 from rotor position signal generator 16 is a signal that proceeds by one stage along a currently recognized rotation direction, rotation direction recognition unit 17 sets

TABLE 2

| Rotor position signal | ... | P1 | P6 | P5 | P4 | P4 | P5 | P6 | P1 | ... |
|---|---|---|---|---|---|---|---|---|---|---|
| Corrected rotor position signal | ... | P1 | P6 | P5 | P4 | P4 | P4 | P6 | P1 | ... |
| Actual rotation direction | ... | Reverse | Reverse | Reverse | Reverse | Normal | Normal | Normal | Normal | ... |
| Recognized motor rotation direction | ... | Reverse | Reverse | Reverse | Reverse | Reverse | Reverse | Normal | Normal | ... | the newly received rotor position signal to corrected rotor position signal 18 without modification. When newly received rotor position signal 15 from rotor position signal generator 16 is a signal that returns by two stages along the currently recognized rotation direction, rotation direction recognition unit 17 corrects the recognition on rotation direction, and sets the newly received rotor position signal to corrected rotor position signal 18 without modification. When newly received rotor position signal 15 from rotor position signal generator 16 is a signal other than the above-described rotor position signals, rotation direction recognition unit 17 determines the newly received rotor position signal as the interfering signal and removes this signal. Rotation direction recognition unit 17 keeps a preceding corrected rotor position signal as the corrected rotor position signal.

With those operations, even when a structure in which the interfering signal is easily involved in the rotor position detection signal is used by, for example, disposing the rotor position detector such as the Hall element close to the interfering signal source such as the windings or the stator cores, or a drive circuit whose GND area is small and on which the interfering signal is easily superimposed is used, stable motor driving can continuously be achieved. Accordingly, downsizing of the motor and the drive circuit board can be achieved. This also contributes improvement of productivity by promoting use of a circuit board in which wiring is provided on a single-side surface of the circuit board.

As described above, motor drive circuit 6 according to the present exemplary embodiment includes; rotor position detector 11 that detects a position of a rotor; rotor position signal generator 16 that generates signals P1, P2, P3, P4, P5, and P6 as rotor position signal 15 based on an output signal from the rotor position detector 11; rotation direction recognition unit 17 that recognizes a rotation direction of the rotor each time one of signals P1, P2, P3, P4, P5, and P6 is input and replaces corrected rotor position signal 18 with rotor position signal 15; and winding current output unit 19 that outputs a current to windings 7 based on corrected rotor position signal 18.

When newly received rotor position signal 15 from rotor position signal generator 16 is a signal that proceeds from a preceding rotor position signal by one stage along a currently recognized rotation direction, which is defined as condition 1, rotation direction recognition unit 17 replaces the newly received rotor position signal with corrected rotor position signal 18. Alternatively, when newly received rotor position signal 15 from rotor position signal generator 16 is a signal that returns from the preceding rotor position signal by two stages along the currently recognized rotation direction, which is defined as condition 2, rotation direction recognition unit 17 corrects the currently recognized rotation direction so as to be reversed, and replaces the newly received rotor position signal with corrected rotor position signal 18. Still alternatively, when newly received rotor position signal 15 from the rotor position signal generator is a signal according to a condition other than the condition 1 and the condition 2, rotation direction recognition unit 17 replaces the preceding rotor position signal with corrected rotor position signal 18.

With those processes, even when the interfering signal is superimposed on the rotor position signal, the interfering signal can be removed to continue the driving, which enables stable driving. Even when a structure in which the interfering signal is easily involved in the rotor position detection signal, for example, a structure in which the rotor position detector such as the Hall element is disposed close to the interfering signal source such as the windings or the stator cores is used, or a drive circuit whose GND area is small and on which the interfering signal is easily superimposed is used, stable motor driving can continuously be achieved. Accordingly, downsizing of the motor and the drive circuit board can be achieved. This also contributes improvement of productivity by promoting use of a circuit board in which wiring is provided on a single-side surface of the circuit board.

Particularly, the Hall sensors can be used as rotor position detector 11. In this case, sensor outputs can be used as rotor position detection signals 12, 13, and 14.

Alternatively, the windings can be used as rotor position detector 11. In this case, induction voltages generated in the windings can be used as rotor position detection signals 12, 13, and 14.

Figure 6:
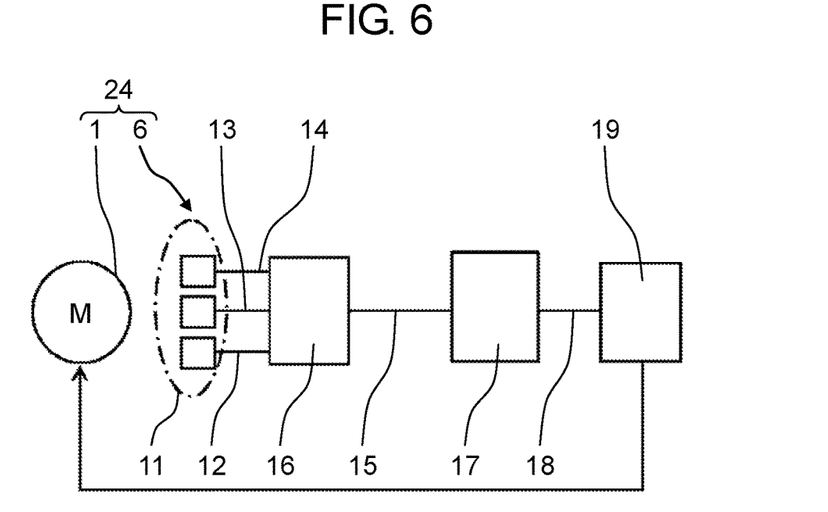
FIG. 6 is a conceptual diagram of a brushless motor drive device according to the exemplary embodiment of the present invention.

FIG. 6 is a conceptual diagram of a brushless motor drive device according to the exemplary embodiment of the present invention.

As illustrated in FIG. 6, brushless motor drive device 24 includes brushless motor 1 and motor drive circuit 6. This configuration can show actions and effects obtained by motor drive circuit 6 described above, when brushless motor 1 is driven.

Figure 7:
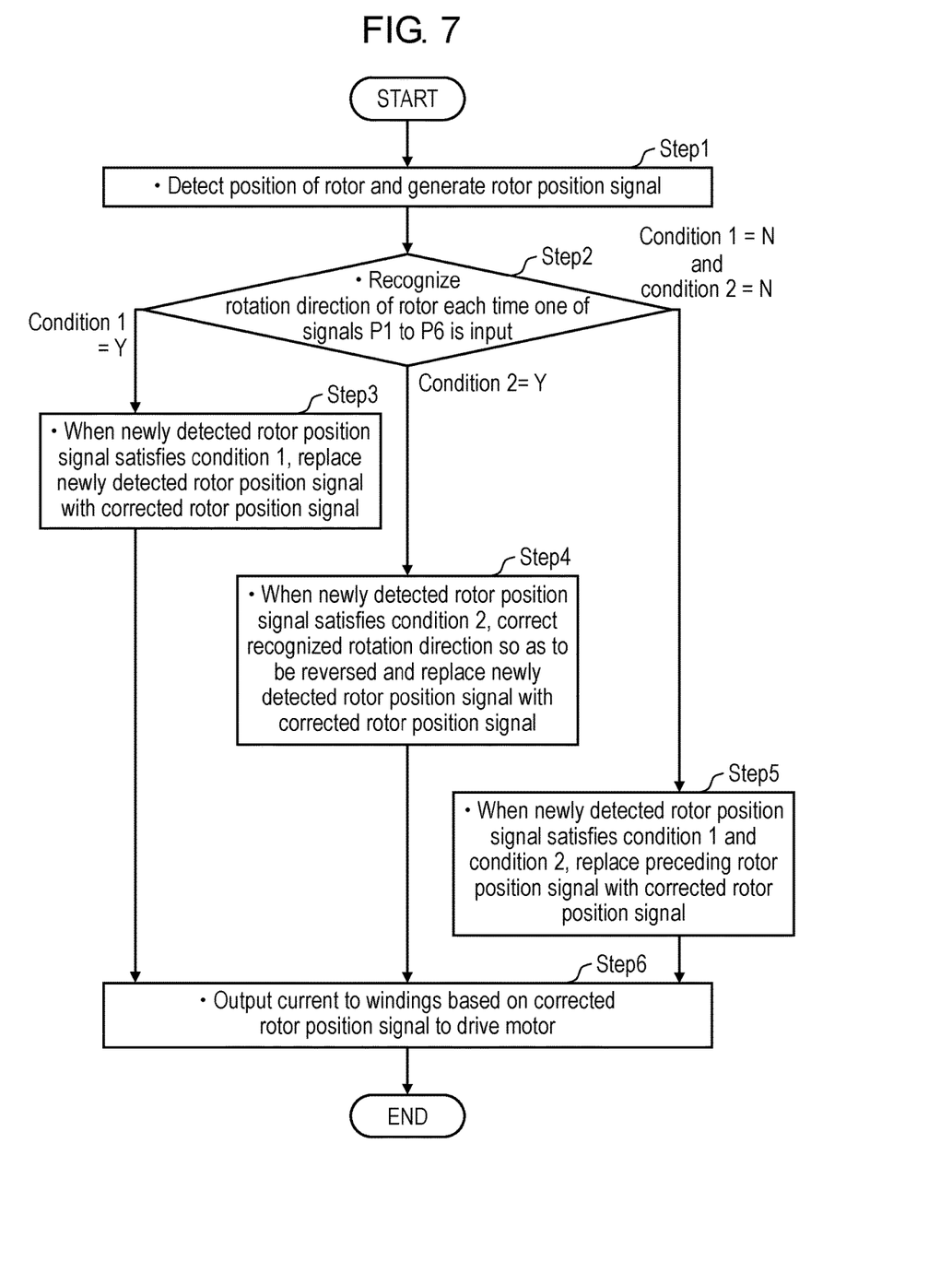
FIG. 7 is a flowchart illustrating a motor control method according to the exemplary embodiment of the present invention.

FIG. 7 is a flowchart illustrating a motor control method according to the exemplary embodiment of the present invention.

As illustrated in FIG. 7, the motor control method according to the present exemplary embodiment detects a position of the rotor, and generates rotor position signal 15 including signals P1, P2, P3, P4, P5, and P6 (step 1). The motor control method according to the present exemplary embodiment recognizes a rotation direction of the rotor each time one of the signals P1, P2, P3, P4, P5, and P6 is input (step 2). The motor control method according to the present exemplary embodiment replaces rotor position signal 15 with corrected rotor position signal 18, and outputs a current to the windings based on corrected rotor position signal 18 to drive the motor (step 6).

The motor control method according to the present exemplary embodiment includes the following steps between step 2 and step 6.

That is, after the rotation direction of the rotor is recognized (step 2), when newly detected rotor position signal 15 is a signal that proceeds from a preceding rotor position signal by one stage along a currently recognized rotation direction, which is defined as condition 1, the newly detected rotor position signal is replaced with the corrected rotor position signal (step 3).

Alternatively, after the rotation direction of the rotor is recognized (step 2), when newly detected rotor position signal 15 is a signal that returns from the preceding rotor position signal by two stages along the currently recognized rotation direction, which is defined as condition 2, the currently recognized rotation direction is corrected so as to be reversed, and the newly detected rotor position signal is replaced with the corrected rotor position signal (step 4).

Still alternatively, after the rotation direction of the rotor is recognized (step 2), when newly detected rotor position signal 15 is a signal according to a condition other than condition 1 and condition 2, the preceding rotor position signal is replaced with corrected rotor position signal 18 (step 5).

With those processes, even when the interfering signal is superimposed on the rotor position signal, the interfering signal can be removed to continue the driving, which enables stable driving. Even when a structure in which the interfering signal is easily involved in the rotor position detection signal, for example, a structure in which the rotor position detector such as the Hall element is disposed close to the interfering signal source such as the windings or the stator cores is used, or a drive circuit whose GND area is small and on which the interfering signal is easily superimposed is used, stable motor driving can continuously be achieved. Accordingly, downsizing of the motor and the drive circuit board can be achieved. This also contributes improvement of productivity by promoting use of a circuit board in which wiring is provided on a single-side surface of the circuit board.

Note that in PTL 1, immediately after a rotation direction is reversely instructed during rotation, an instructed rotation direction and an actual rotation direction are different from each other, thereby hindering normal determination. However, according to the present exemplary embodiment, the actual rotation direction is detected, and therefore a rotation direction as instructed is achieved, thereby further improving reliability.

The present exemplary embodiment does not necessarily need the analog filter for interfering signal removal. Accordingly, reduction in cost, downsizing of the motor, and downsizing of the drive circuit board owing to reduction in mounting area can be achieved.

INDUSTRIAL APPLICABILITY

The present invention exerts an effect on an increasing interfering signal with increase in output power of a motor, and is applicable to various motors ranging from a small type to a large type.

REFERENCE MARKS IN THE DRAWINGS 1 brushless motor
3 stator assembly
4 frame
5 shaft
6 motor drive circuit
7 winding
8 stator core
9 bearing
10 permanent magnet
11 rotor position detector
12, 13, 14 rotor position detection signal
15 rotor position signal
16 rotor position signal generator
17 rotation direction recognition unit
18 corrected rotor position signal
19 winding current output unit
20 interfering signal
22 lead wire
24 brushless motor drive device

The invention claimed is:

1. A motor drive circuit comprising:
a rotor position detector that detects a position of a rotor and outputs a rotor position detection signal;
a rotor position signal generator that generates signals P1, P2, P3, P4, P5, and P6 as a rotor position signal based on the rotor position detection signal output from the rotor position detector;
a rotation direction recognition unit configured to recognize a rotation direction of the rotor each time one of the signals P1, P2, P3, P4, P5, and P6 is input,
when a newly received rotor position signal from the rotor position signal generator is a signal that proceeds from a preceding rotor position signal by one stage along a currently recognized rotation direction, which is defined as condition 1, replace the newly received rotor position signal with a corrected rotor position signal,
when the newly received rotor position signal from the rotor position signal generator is a signal that returns from the preceding rotor position signal by two stages along the currently recognized rotation direction, which is defined as condition 2, correct the currently recognized rotation direction so as to be reversed, and replace the newly received rotor position signal with the corrected rotor position signal, and
when the newly received rotor position signal from the rotor position signal generator is a signal according to a condition other than the condition 1 and the condition 2, replace the preceding rotor position signal with the corrected rotor position signal; and
a winding current output unit that outputs a current to a winding based on the corrected rotor position signal.

2. The motor drive circuit according to claim 1, wherein the rotor position detector is a Hall sensor.

3. The motor drive circuit according to claim 1, wherein the rotor position detector is the winding.

4. A brushless motor drive device comprising:
a brushless motor; and
the motor drive circuit, according to claim 1, that drives the brushless motor.

5. A motor control method comprising:
detecting a position of a rotor and generating a rotor position signal including signals P1, P2, P3, P4, P5, and P6;
recognizing a rotation direction of the rotor each time one of the signals P1, P2, P3, P4, P5, and P6 is input;
when a newly detected rotor position signal is a signal that proceeds from a preceding rotor position signal by one stage along a currently recognized rotation direction, which is defined as condition 1, replacing the newly detected rotor position signal with a corrected rotor position signal;
when the newly detected rotor position signal is a signal that returns from the preceding rotor position signal by two stages along the currently recognized rotation direction, which is defined as condition 2, correcting the currently recognized rotation direction so as to be reversed, and replacing the newly detected rotor position signal with the corrected rotor position signal;
when the newly detected rotor position signal is a signal according to a condition other than the condition 1 and the condition 2, replacing the preceding rotor position signal with the corrected rotor position signal; and
outputting a current to a winding based on the corrected rotor position signal to drive the motor.

* * * * *